US006807605B2

(12) United States Patent
Umberger et al.

(10) Patent No.: US 6,807,605 B2
(45) Date of Patent: Oct. 19, 2004

(54) MANAGING A DATA STORAGE ARRAY, A DATA STORAGE SYSTEM, AND A RAID CONTROLLER

(75) Inventors: David Umberger, Boise, ID (US); Guillermo Navarro, Boise, ID (US); Rodger Daniels, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 10/264,915

(22) Filed: Oct. 3, 2002

(65) Prior Publication Data

US 2004/0068610 A1 Apr. 8, 2004

(51) Int. Cl.[7] .............................................. G06F 12/00
(52) U.S. Cl. ........................ 711/114; 711/154; 711/165
(58) Field of Search ................................. 711/112, 114, 711/154, 165, 162; 714/6, 7

(56) References Cited

U.S. PATENT DOCUMENTS

| 5,392,244 | A | | 2/1995 | Jacobson et al. ............ 711/114 |
| 5,664,187 | A | | 9/1997 | Burkes et al. ............... 707/205 |
| 5,960,451 | A | | 9/1999 | Voigt et al. .................. 711/114 |
| 6,230,240 | B1 | | 5/2001 | Shrader et al. .............. 711/114 |
| 6,275,898 | B1 | * | 8/2001 | DeKoning .................... 711/114 |
| 6,279,138 | B1 | * | 8/2001 | Jadav et al. ................. 714/800 |
| 6,434,682 | B1 | * | 8/2002 | Ashton et al. ............... 711/162 |
| 6,687,765 | B2 | * | 2/2004 | Surugucchi et al. .......... 710/15 |

OTHER PUBLICATIONS

Wilkes, et al., "The HP AutoRAID Hierarchical Storage System", © Feb. 1, 1996, ACM Transactions on Computer Systems, p. 108–136.*

U.S. patent Appn. filed Oct. 3, 2002, titled "Method of Managing a Data Storage Array, and a Computer System Including a RAID Controller", by David Umberger and Guillermo Navarro, (HE12–199).
U.S. patent Appn. filed Oct. 3, 2002, titled "Computer Systems, Virtual Storage Systems and Virtual Storage System Operation Methods", by Michael Brent Jacobson and Lee L. Nelson, (HE12–200).
U.S. patent Appn. filed Oct. 3, 2002, titled "Virtual Storage Systems, Virtual Storage Methods and Methods for Over Committing a Virtual RAID Storage System", by Michael Brent Jacobson and Lee L. Nelson, (HE12–201).
U.S. patent Appn. filed Oct. 3, 2002, titled "Virtual Storage Systems and Virtual Storage System Operational Methods", by Rodger Daniels and Lee L. Nelson, (HE12–202).
U.S. patent Appn. filed Oct. 3, 2002, titled "Virtual Storage Systems and Virtual Storage System Operational Methods", by Lee. L. Nelson and Rodger Daniels, (HE12–203).

* cited by examiner

Primary Examiner—Donald Sparks
Assistant Examiner—Brian R. Peugh

(57) ABSTRACT

A system and method for managing a RAID data storage array is provided having a plurality of data storage disks and a RAID controller respectively coupled to each of the data storage disks, and a user interface coupled to the RAID controller, wherein the RAID controller is configured to store pointers corresponding to data within the storage disks, wherein the RAID controller is further configured to anticipate a data modification operation from the user interface and to selectively copy a block of data from one RAID level to a different RAID level storage location within the storage array responsive to a protective status and the anticipating. Also provided is a RAID controller configured to selectively copy data to a different RAID level within a storage array responsive to the anticipation of a data modification operation and a protective status.

19 Claims, 5 Drawing Sheets

MANAGING A DATA STORAGE ARRAY, A DATA STORAGE SYSTEM, AND A RAID CONTROLLER

FIELD OF THE INVENTION

The invention relates to data storage systems and methods. More particularly, the invention relates to a system and method of managing data within a computer accessible storage array.

BACKGROUND OF THE INVENTION

The use of an array of disks for computer-based data storage is known. One category of disk arrays is referred to as Redundant Array of Inexpensive Drives (RAID). Within a RAID system, varying levels of data storage redundancy are utilized to enable reconstruction of stored data in the event of data corruption or disk failure. These various types of redundant storage strategies are referred to as RAID levels.

For example, RAID level 1, also referred to as "the mirror method", defines data which is stored with complete redundancy, typically permitting independent, simultaneous access to all copies of the data set. RAID level 6, also referred to as "the parity method", defines data storage which utilizes bit-parity information, generated by way of an Exclusive-OR operation, to create a parity data set. The parity data set may be used to reconstruct original data (i.e., now corrupt) using another Exclusive-OR operation. In comparison, RAID level 1 provides relatively fast, simultaneous access to multiple copies of the same data set; while RAID level 6 provides for greater storage media efficiency than that of RAID level 1. Accordingly, RAID level 1 is considered a "high performance" or "high" RAID level as compared to level 6.

Due to the higher performance of RAID level 1 storage, it is desirable to keep the most frequently accessed data within RAID level 1, to the extent that physical storage resources permit. Toward this goal, some RAID management systems employ techniques in which more frequently accessed data is moved to RAID level 1 storage, while less frequently accessed data is shifted to RAID level 6 (or other RAID levels). RAID data storage is discussed in detail in U.S. Pat. Nos. 5,392,244 and 5,664,187, which are incorporated herein by reference.

The vast amounts of data that are stored in many computer systems, as well as the ever-growing demand to access that data, has pushed system developers to seek ways of providing fast, multiple-user access to the data. One technique utilizes a system of pointers (i.e, mapping) to point at the data within the storage media. Software applications make use of the pointers to access relevant data within the storage system. A system of pointers may be used in combination with various RAID levels of storage.

The RAID data storage can keep track of the most recently written data blocks. This set of most recently written blocks is called the "Write Working Set". The pointers to these data blocks are kept in memory. The data blocks that make up the Write Working Set are kept in the physical storage. The Write Working Set does the mapping of the most recently written blocks to the physical storage. The data blocks that comprise this set can be in both RAID levels, this is, some of the blocks that are part of the Write Working Set can be in RAID level Six and the other part can be in RAID level One. Of course, it could be the case that all the data blocks are either in RAID level Six or in RAID level One. Whatever the case, the purpose of keeping the Write Working Set is to realize a list of pointers to the most recently written data blocks, so as to facilitate future migrations of those data blocks to the RAID level 1 storage. This gives the user better response time when accessing these data blocks again. The use of the Write Working Set is already in use and it is not the innovation being described here in this document.

One of the features of the RAID data storage is the possibility to preserve data as it was at some point in time. This feature is called "snapshot", from now on, in this document, the snapshot term will be used to denote this feature. The data to be preserved is said to be "snapped". After the data is snapped, it can be considered protected against future changes. This allows the user to take a "snapshot" of some data to be preserved. If the data is updated (written to) in the future then the snapped data is preserved and a new copy with the updated data is also stored in the system. This way, the user can have the snapped (i.e. the original) data and the updated data both in the RAID data storage. The snapping of the data is independent of the RAID level the data is in. When some data is snapped the data will be preserved regardless of the RAID level the data is in. The system of pointers to the snapped data blocks is known as the "Snapshot Maps". This idea as well as the Write Working Set described above is not an innovative idea and it is not the idea described here in this patent disclosure.

However, when system user operations require that the snapped data be updated (written to), it is necessary to follow a sequence of steps to ensure the snapped data will be preserved and the updated data will be written to. The procedure used to preserve the original data and store the updated data separately in the physical storage is called a "divergence". Both, the snapped and updated data will be kept in the RAID data storage. The steps performed in divergence are: 1) The data to be written to is stored in memory. 2) The snapped data is read, usually as a data block bigger than the data to be written to. 3) The data block with the snapped data is merged with the new data in memory and the combined data is then considered the updated data. 4) A new pointer to the updated data is created in the general tables that hold the maps for all the RAID level One and RAID level Six data. The pointer to the snapped (i.e. original) data is kept in the snapshot maps. 5) The updated data is written to in the physical storage. At the end of these first four steps the snapped data is still in the physical RAID data storage as well as the new, updated data. This procedure (the divergence), to ensure that the snapped data and the new data are kept in the physical storage, is performed in the foreground when the users writes to the data and results in undesirable delays from the perspective of the system users.

Therefore, it is desired to provide a data management system in which the update of snapped data is performed with a reduced impact on user access to the data stored within the system.

SUMMARY OF THE INVENTION

The invention provides an improved system and method for managing the divergences of snapped data within a RAID storage system, in coordination with the data access requests of system users. The preferred embodiment of the invention provides divergence in the background of the data blocks that are snapped AND are in a write working set (i.e., a map to those data spaces most recently written to). Therefore, the preferred embodiment of the invention involves predicting the divergences of the snapped data blocks by using the write working set.

One embodiment of the invention provides a system for managing a data storage array, comprising a plurality of data storage disks configured as an array, and a RAID controller coupled to each of the data storage disks within the array and configured to access data within the array and to measure the rate at which data within the array is being accessed by a user application, the RAID controller further including a memory and a user interface coupled to the RAID controller, the RAID controller being further configured to store a set of pointers within the memory, the pointers respectively corresponding to blocks of data within the array, each pointer being accessible by the user application, the RAID controller being further configured to anticipate a data modification operation to a particular block of data in the array responsive to the measuring and to selectively copy the particular block of data to a different block of data within a different RAID level storage location within the array responsive to the anticipating.

Another embodiment of the invention provides a method of managing a data storage system, comprising providing an array of data disks configured to store data, providing a RAID controller coupled to the array, providing a user interface computer coupled to the RAID controller, running an application program using the user interface computer, reading data stored within the array using the application program and the RAID controller, assembling and storing a pointer corresponding to the read data using the RAID controller, accessing the data within the array by way of the pointer using the application program and RAID controller, measuring the rate of the accessing using the RAID controller, anticipating a data modification operation to particular data in one RAID level within the array in response to the measuring using the RAID controller, selectively copying the particular data to another RAID level within the array in response to the anticipating using the RAID controller, and performing the data modification operation to the copied data within the array using the RAID controller, the copying being performed as a background operation using the RAID controller.

Another embodiment of the invention provides a RAID controller comprising a memory configured to store data, monitoring electronics configured to measure a rate at which an array of data storage disks coupled to the controller are accessed using the controller, and circuitry coupled to the memory and the monitoring electronics and configured to access data at different RAID levels within the array in response to corresponding instructions from a computer, the circuitry being further configured to selectively configure a pointer related to the data in the array in response to a corresponding instruction from the computer, the circuitry being further configured to anticipate a data modification operation in response to the measuring, the circuitry being further configured to selectively copy a portion of the data in one RAID level within the array to a different RAID level within the array as a background operation in response to the anticipating using the memory.

Another embodiment of the invention provides a computer readable medium comprising computer readable code, the computer readable code configured to cause a RAID controller to read data within an array of data storage disks coupled to the RAID controller in response to corresponding instructions from a computer, selectively configure a pointer related to the read data, access data within the array using the pointer in response to corresponding instructions from the computer, anticipate a data modification operation in response to measuring a rate at which the data within the array is accessed, and selectively copy a portion of the data in one RAID level within the array to a different RAID level within the array as a background operation in response to the anticipating.

Still another embodiment of the invention provides a RAID controller, comprising a memory configured to store data, monitoring electronics configured to measure a rate at which an array of data storage disks coupled to the RAID controller are accessed using the RAID controller, and firmware bearing computer readable code, the computer readable code being configured to cause the RAID controller to read data within the array in response to corresponding instructions from a computer, selectively configure a pointer related to the read data, access data within the array using the pointer in response to a corresponding instruction from the computer, anticipate a data modification operation in response to measuring the rate using the monitoring electronics, and selectively copy a portion of the data in one RAID level within the array to a different RAID level within the array as a background operation in response to the anticipating using the memory.

Another embodiment of the invention provides a computer readable medium comprising computer readable code, the computer readable code configured to cause a computer to read data within different RAID levels within an array of data storage disks coupled to the computer in response to corresponding instructions sent from the computer to a RAID controller, selectively configure a plurality of pointers related to the read data, the pointers being stored within a memory of the computer, access data at different RAID levels within the array using the pointers in response to corresponding instructions sent from the computer to the RAID controller, measure a rate at which the computer is accessing the data within the array, anticipate a data modification operation in response to the measuring, and selectively instruct the RAID controller to copy a portion of the data in one RAID level within the array to a different RAID level within the array as a background operation in response to the anticipating such that the measuring, anticipating, and copying steps occur from time to time.

Another embodiment of the invention provides a method of managing a data storage system, comprising providing an array of data disks configured to store data, providing a RAID controller coupled to the array, providing a computer coupled to the RAID controller, providing a computer readable medium having computer readable code in cooperative relation to the computer, running the computer readable code using the computer, reading data stored within the array using the computer readable code and the computer and the RAID controller, assembling and storing a pointer corresponding to the read data within a memory of the computer using the computer readable code and the computer, accessing the data within the array by way of the pointer using the computer readable code and the computer and the RAID controller, measuring the rate of the accessing the data using the computer readable code and the computer, anticipating a data modification operation to particular data in one RAID level within the array in response to the measuring using the computer readable code and the computer, selectively copying the particular data to another RAID level within the array in response to the anticipating using the computer readable code and the computer and the RAID controller, and performing the data modification operation to the copied data within the array using the computer readable code and the computer and the RAID controller, the copying and the data modification being performed as a background operation.

DETAILED DESCRIPTION OF THE INVENTION

Attention is directed to the following commonly assigned applications, which are incorporated herein by reference:

U.S. patent application Ser. No. 10/264,573 Attorney Docket 100110705-1 (HE12-199), entitled "Method of Managing a Data Storage Array, and a Computer System Including a Raid Controller", by inventors David Umberger and Guillermo Navarro; U.S. patent application Ser. No. 10/264,957 Attorney Docket 100110839-1 (HE12-200) entitled "Computer Systems, Virtual Storage Systems and Virtual Storage System Operational Methods", by inventors Michael Brent Jacobson and Lee L. Nelson; U.S. patent application Ser. No. 10/264,659 Attorney Docket 100110845-1 (HE12-201) entitled "Virtual Storage Systems, Virtual Storage Methods and Methods of Over Committing a Virtual RAID Storage System", by inventors Michael Brent Jacobson and Lee L. Nelson; U.S. patent application Ser. No. 10/264,525 Attorney Docket 100110938-1 (HE12-202) entitled "Virtual Storage Systems and Virtual Storage System Operational Methods", by inventors Rodger Daniels and Lee L. Nelson; and U.S. patent application Ser. No. 10/264,661 Attorney Docket 100110939-1 (HE12-203) entitled "Virtual Storage Systems and Virtual Storage System Operational Methods", by inventors Lee L. Nelson and Rodger Daniels.

Figure 1:
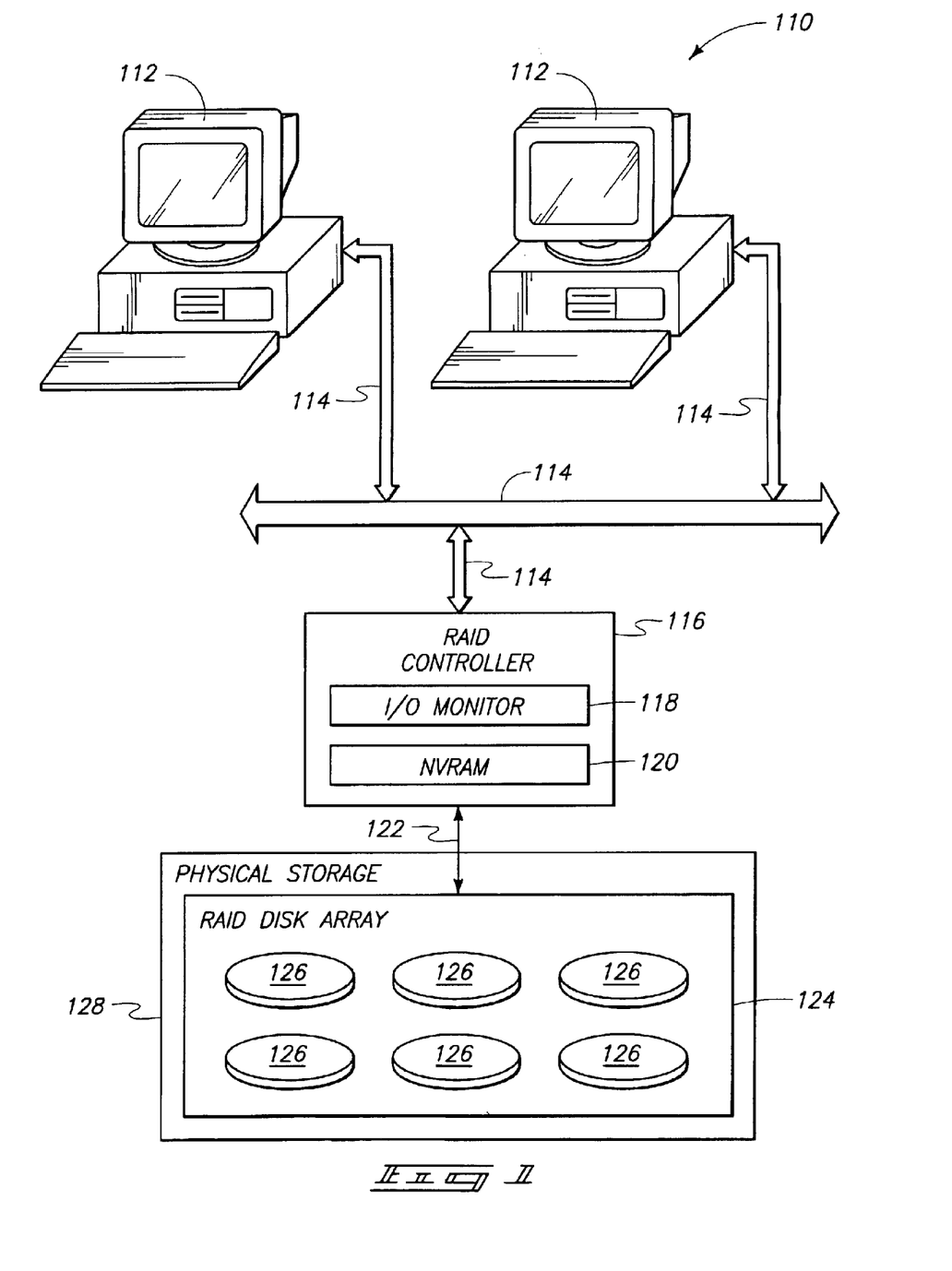
FIG. 1 is an illustration of interrelated elements of one possible embodiment of the present invention.

FIG. 1 illustrates one possible embodiment of a RAID based system 110 in accordance with one aspect of the invention. The system 110 includes user interface computers 112 respectively coupled in data communication with a RAID controller 116 by way of a network 114. The RAID controller 116 includes input/output monitoring (I/O monitor) circuitry 118 and a memory, such as non-volatile random access memory NVRAM) 120.

The input/output monitoring circuitry 118 is configured to monitor the instantaneous rate at which data is being written to, or read from, physical storage 128 by user interface computers 112. The memory 120 is used by the controller 116 for a number of tasks, including, for example: to serve as a buffer during a data copy, write, or read operation; to store pointers pointing to particular data within physical storage 128; etc. Other uses for the memory 120 are possible. As used herein, the term migration is applied to any data copying or movement operation between RAID levels within the storage system 128, including the subsequent data write and/or deletion operations performed upon the copied or moved data.

Further included in system 110 is a RAID disk array 124 which is coupled in data communication with the controller 116 by way of a coupling 122. The disk array 124 includes a plurality of data storage disks 126, each being individually accessible by the controller 116. The disks 126 of the array 124 constitute the physical data storage 128 of system 110.

Figure 2:
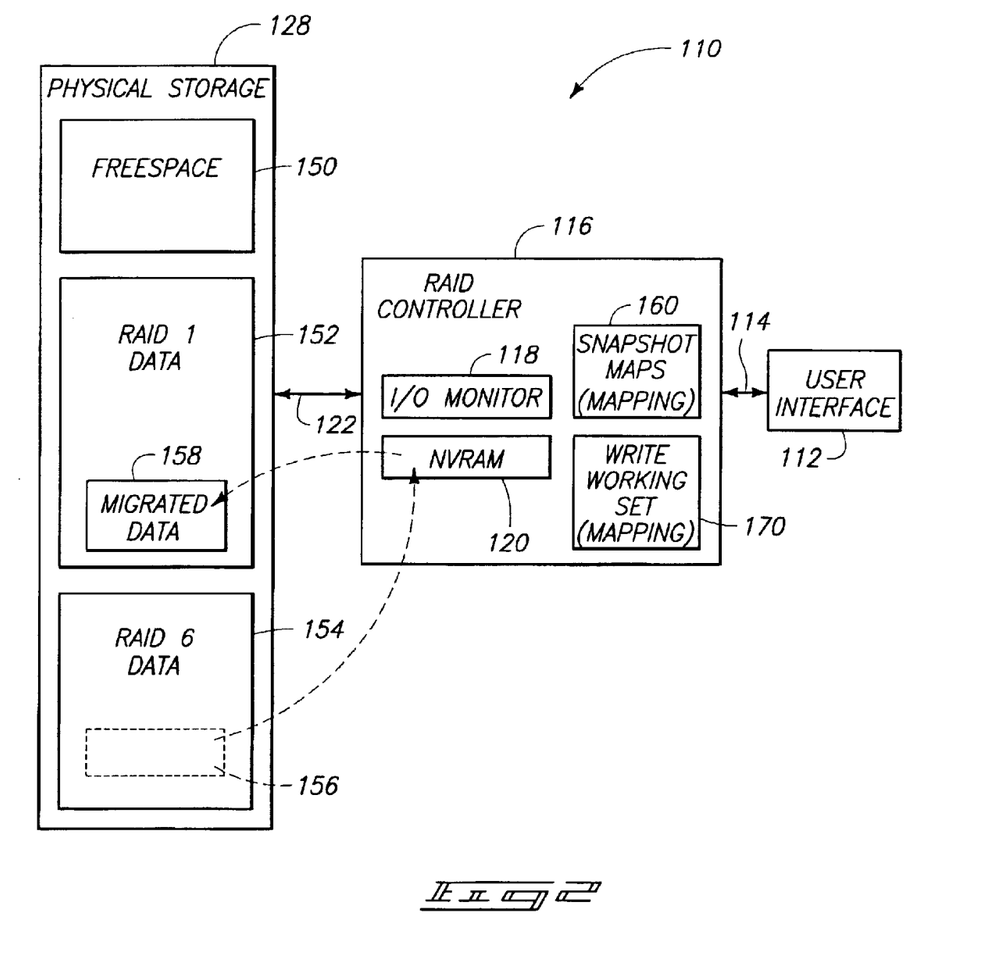
FIG. 2 is a block diagrammatic view of one possible embodiment of the present invention.

FIG. 2 illustrates system 110 in block diagrammatic form. The physical storage 128 comprises a free space (i.e., unused storage space) 150; a data space 152; and a data space 154. The data spaces 152 and 154 are utilized to store data in RAID levels one and six, respectively, and are defined and managed by the controller 116. A user interface computer 112 accesses the data within the spaces 152 and 154 by way of commands sent to the controller 116. Controller 116 re-allocates the free space 150 to the data spaces 152 and 154 as needed to accommodate writing and deleting of data within the data spaces 152 and 154. As shown, controller 116 has copied and perhaps modified (i.e., written to or deleted from) data within block 156 to data block 158, using memory 120 within controller 116. Such data copying and/or modification operations are commonly carried out by system 110. The write working set (i.e., virtual mapping) 170 is also shown in FIG. 2. The write working set 170 holds the pointers to the most recently written data spaces. Also shown in FIG. 2 are snapshot maps 160, which perform substantially as described above.

Figure 3:
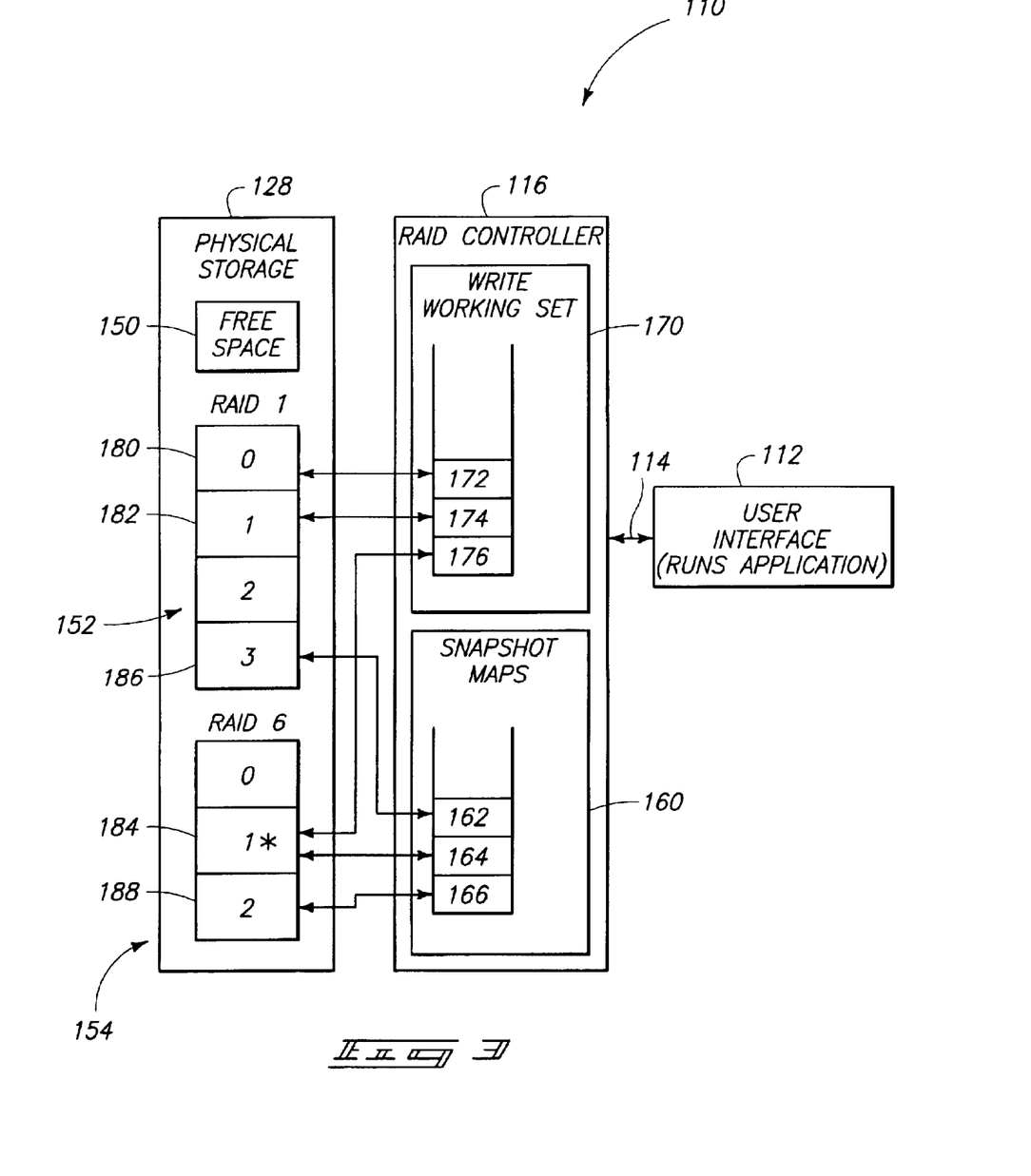
FIG. 3 is another block diagrammatic view of one possible embodiment of the invention.

FIG. 3 illustrates the interrelationship of the physical storage 128, the write working set 170, and the user interface computer 112 of system 110, according to one aspect of the invention. An application program (not shown) operates (i.e., runs) within user interface computer 112. As stated above, the write working set is basically a lists of pointers to the most recently written blocks. No data is kept in the write working set, only the pointers to those blocks that have been most recently written to. In FIG. 3, the write working set 170 includes pointers to the most recently written data blocks, which in this example are blocks 180, 182 and 184. The pointers are named 172, 174 and 176. The pointers 172, 174 and 176 are associated with data blocks 180, 182 and 184, respectively, within physical storage 128. The write working set 170, with its pointers to blocks 172, 174 and 176 reside in memory 120 (or other, specific memory resources; not shown) of the RAID controller 116.

Through the use of write working set 170, system 110 achieves greater operational speed (i.e., reduced delay) than is achieved when the application program running in interface computer 112 does not have write working set 170 as a resource. The delay reduction is due to the fact that the system will migrate all the data blocks that are pointed to by the write working set to the RAID level one 152, which provides faster performance than RAID level six 154. Of course, if there are data blocks pointed to by the write working set that reside in RAID level one 152 already, then those data blocks are not migrated. They are left in the RAID level one 152 so the user can access the data at a greater operational speed. The data blocks pointed to by the write working set that are in RAID level six 154 are migrated to the RAID level one 152 in the background (i.e., as a process running along with the users accesses) so that at some point all the data blocks pointed to by the write working set will be in RAID level one 152. As it was explained before, the data blocks in the write working set are the most recently written to data blocks. The reason they are migrated to RAID level one 152 is because it has been observed that in most of the cases when the user, via some application program, writes to some data block, the probability of accessing that block by either reading or re-writing its contents is very high. Therefore, the write working set optimizes the use of the fast (faster of both, level one and six) RAID level one 152 data by keeping in this level the data that is most likely to be accessed by the user.

The snapshot maps 160 include pointers to the data blocks that have been snapped, shown as blocks 184, 186 and 188. The pointers associated with the blocks 184, 186 and 188 within physical storage 128 are named 164, 162 and 166, respectively. The snapshot maps 160 with its pointers 162, 164 and 166 reside in memory 120 (or other, specific memory resources; not shown) of the RAID controller 116.

Figure 4:
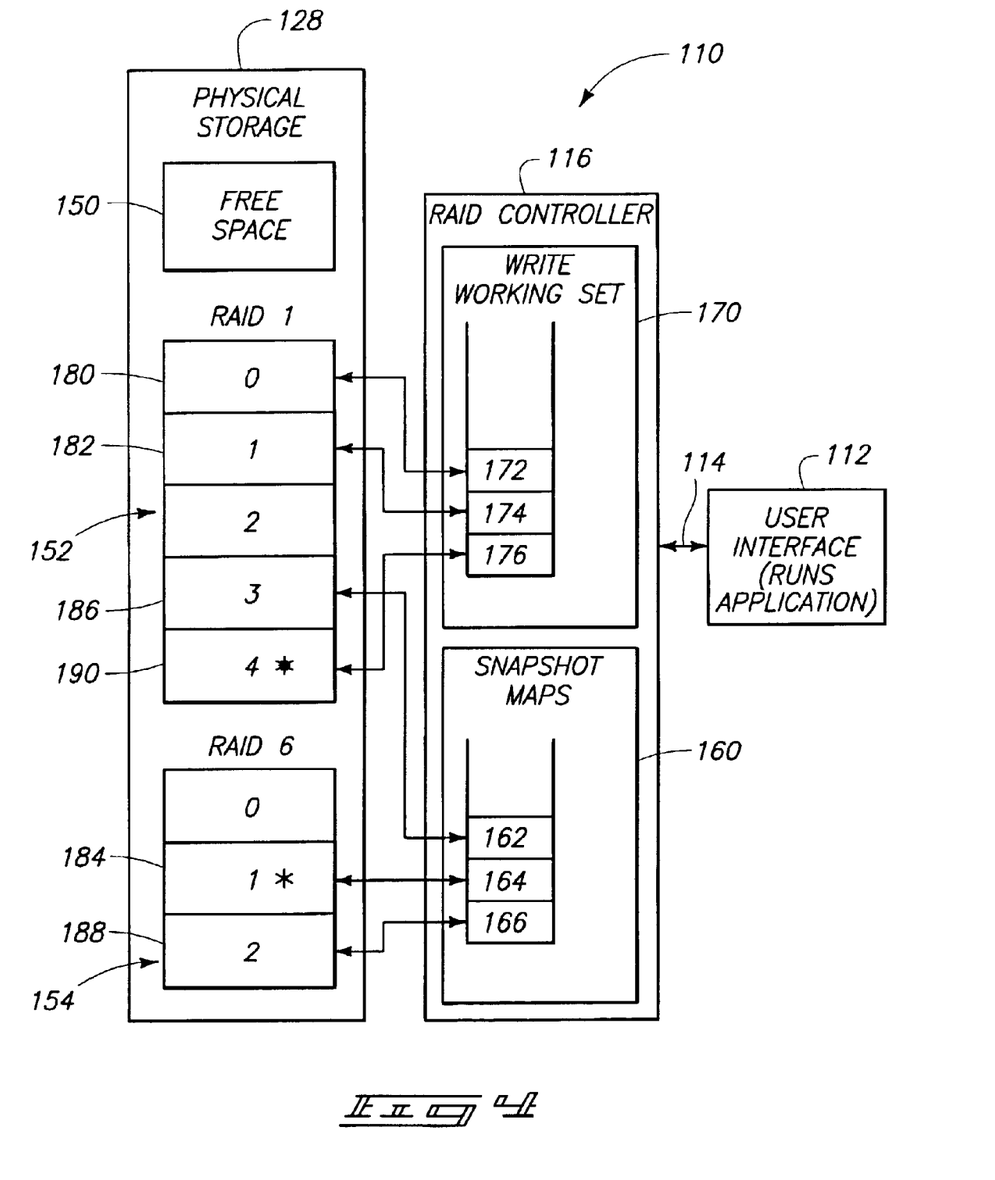
FIG. 4 is another block diagrammatic view of one possible embodiment of the invention.

FIG. 4 illustrates the results of a predicted divergence within system 110, according to one aspect of the invention. The data block 184 is pointed to by both the write working set maps and the snapshot maps. The invention described in this patent application is essentially the prediction of the divergence that can occur for the data block 184. Since the data block 184 is in the RAID level six 154 of storage, and is pointed to by the write working set 170, then the block 184 is going to be promoted to the RAID level one 152 eventually, if there is enough RAID level one 152 allocation for more blocks. One of the novelties of the invention compared to current implementations of the write working set and snapshot features, is that instead of simply migrating the data block 184 to the RAID level one 152 storage, a divergence is performed and the copy of the data block 184 is migrated to RAID level one 152 and the snapped (i.e. original) data is still left in its original physical location within storage 128.

In FIG. 4 we see that the snapped (i.e. original) data block 184 is now pointed to by pointer 164 in the snapshot maps. The snapped data block is left in RAID level six 154. Another aspect of the invention is that the snapped data blocks 184, and 188 are migrated to the RAID level six 154 since it is assumed that they will not be updated (written to) again. This is obvious since the purpose behind why those data blocks 184, and 188 were snapped was to preserve the data in those blocks 184, and 188. In this example, since the snapped block 184 was already in the RAID level six 154 of storage 128 there is no need to migrate it. If this snapped data block 184 had been originally in RAID level one 152 then it would have been diverged and the diverged copy would have been left in RAID level one 152 and the snapped (i.e. original) data block would have been migrated to the RAID level six 154. For the purpose of this example, we can see that the snapped data block 184 is left in the RAID level six 154 pointed to by the pointer 164 in the snapshot maps and the diverged copy is migrated to the RAID level one 152 storage as data block 190, which is pointed to by pointer 176 in the write working set maps. When an application running within user interface 112 updates data block 184 the array controller 116 will actually update the data block 190 pointed to by pointer 176 in the write working set maps. This way the update will not suffer the delay associated with the divergence that otherwise would have occurred if the data block had not been diverged. From this point on, all subsequent updates will occur to data block 190.

According to another aspect of the invention, the divergence of the data block 184 was performed as a background operation prior to a subsequent data write (or deletion) operation. In this way, access time (i.e., delay as seen by the user of interface 112), by the application program to data block 184 has been reduced. Also, any subsequent data write and/or deletion operation is eventually performed on the new data block 190, pointed to by pointer 176 of the write working set maps. Since this divergence was performed in the background, the user was spared the delay that would have been seen when updating (writing to) data block 184, as well as saving the user any delay associated with accessing other data within the physical storage 128.

As a result of the data migration, the write working set 170 now has pointer 176 that points to data block 190 and the snapshot maps have pointer 164 that points to data block 184, permitting an application running within user interface 112 to make use of both modified (data block 190) and unmodified (i.e., snapped) versions of the data originally stored in block 184.

As described above, the data migration and divergence processes are carried out by the RAID controller 116, using memory 120 as needed. In an alternative embodiment, the user interface 112 runs software which generates and maintains the write working set and snapshot maps within the user interface 112, utilizing memory and other resources inherent to the user interface 112. In this alternative embodiment, the user interface 112 under appropriate software control provides corresponding instructions to the RAID controller 116 by way of the network 114 to carry out data migration and/or divergence within the RAID disk array 124 substantially as described above.

Figure 5:
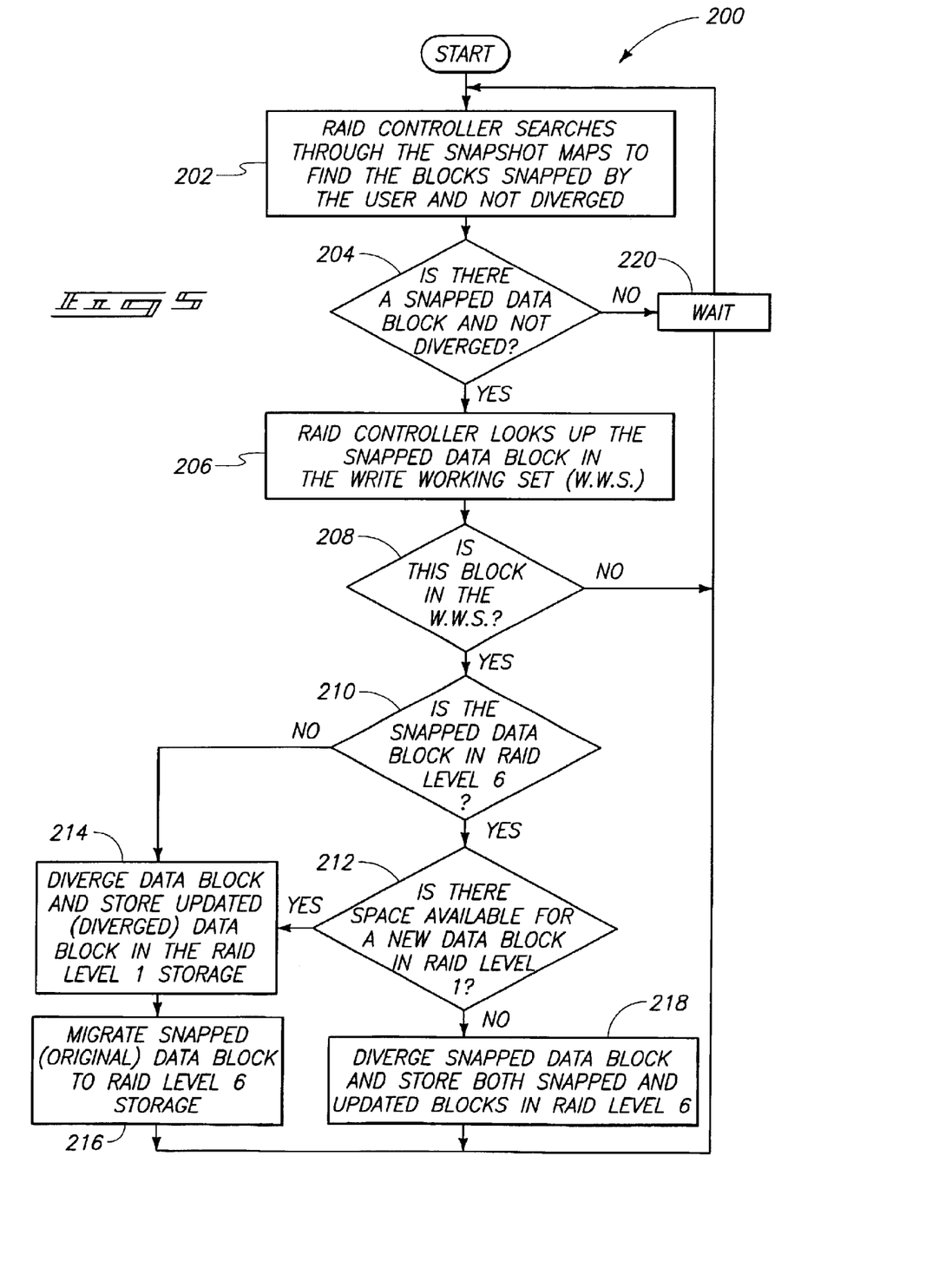
FIG. 5 is a flowchart of the logic performed according to one possible embodiment of the invention.

FIG. 5 illustrates the logic sequence 200 used in one possible embodiment of the invention. Reference is also made to previously described FIGS. 1 through 4.

In step 202, the RAID controller 116 looks for snapped data blocks in the snapshot maps 160 which have not been diverged. As previously mentioned, the illustrated embodiment of the invention predicts the divergence of snapped data blocks 184, 186 and 188 based on their presence in the write working set 170. As previously mentioned, this process runs in the background so it can be activated periodically by at some interval of time configured in the RAID controller 116. For purposes of example, the snapped and undiverged data block 184 has associated pointer 164 in the snapshot maps 160, and associated pointer 176 in the write working set 170.

In step 204, if the RAID controller 116 finds a snapped data block which has not been diverged, the logic 200 then proceeds to step 206. Otherwise, it proceeds to step 220 where the RAID controller 116 will wait for some interval of time in the background before starting the logic sequence 200 again.

In step 206, the RAID controller 116 looks up the snapped and undiverged data block to see if it also is pointed to by the write working set 170.

In step 208, the RAID controller 116 decides if the snapped data block is also present in the write working set maps 170. If it is, then the likeliness of this snapped data block being written to again, such that it will require a divergence, is very high. Based on this likeliness, the RAID controller 116 can predict that this snapped data block will need a divergence in the future, and the logic 200 proceeds to step 210. If the snapped data block is not in the write working set 170, it cannot be predicted whether this snapped data block will be diverged, and therefore processing is completed but resumed some time later; the logic 200 then proceeds to step 220.

In step 210, the RAID controller 116 determines the RAID level in which the snapped data block resides. As shown in FIG. 2, it can reside only in the data space 152 (i.e. RAID level one), or the data space 154 (i.e., RAID level six). If the snapped data block resides in the data space 152, then the logic 200 proceeds to step 214. If the snapped data block resides in the data space 154, then the logic 200 proceeds to step 212.

In step 212, the RAID controller 116 determines the available space in the data space 152 (i.e., RAID level one), and decides if it is possible to store one more data block there. If so, then the logic 200 proceeds to step 214. If not, then the logic 200 proceeds to step 218.

In step 214, if the snapped data block is in the data space 152 (RAID level one), then the RAID controller 116 executes a divergence of the snapped data block and stores the diverged data block in the data space 152 (RAID level one) of the physical storage 128. For further purposes of example, the data block 190 results from the divergence of the data block 184.

In step 216, a continuation of step 214, the RAID controller 116 stores the snapped (original) data block in the data space 154 (RAID level six) of the physical storage 128, if it is not already there. If it is already there, then this snapped data block can be in left the RAID level six 154 since this data block will not be written because the data in it was snapped to be preserved. It can be deleted if the user decides to do so but for the purpose of illustration, we can assume this snapped data block will be read from now on. After this step 216 is complete, the logic 116 proceeds to step 220 where the RAID controller 116 waits for some configured time before it starts this process over again.

In step 218, since there was no space for more data in the data space 152 (RAID level one), the RAID controller 116 decides to store both the snapped (i.e., original) data block and the diverged data block in the data space 154 (RAID level six) of physical storage 128. After this operation is complete, the RAID controller 116 proceeds to step 220 to wait for some configured time before it starts this logic 200 process over again.

As stated before, all the operations are completed in background. With the divergence already made for the snapped data blocks that were not diverged there is a reduced access delay imposed upon the user of interface computer 112, as compared to a similar (not shown) write operation being performed at the same time as the copying of the original data to the higher RAID level.

As shown in FIG. 5, the logic sequence 200 is performed in a repetitive loop fashion. In another embodiment of the invention (not shown), the sequence 200 would be carried out as a single-pass operation. Other embodiments are possible. In one embodiment, the logic sequence 200 is implemented using firmware having computer readable code within a RAID controller 116. Other embodiments of RAID controller configured to execute logic sequence 200 are possible.

In compliance with the statute, the invention has been described in language more or less specific as to structural and methodical features. It is understood, however, that the invention is not limited to the specific features shown and described, since the means herein disclosed comprise forms of putting the invention into effect. The invention is, therefore, claimed in any of its forms or modifications within the proper scope of the appended claims appropriately interpreted in accordance with the doctrine of equivalents.

What is claimed is:

1. A system for managing a data storage array, comprising:
   a plurality of data storage disks configured as an array; and
   a RAID controller coupled to each of the data storage disks within the array and configured to access data within the array and to measure the rate at which data within the array is being accessed by a user application, the RAID controller further including a memory and a user interface coupled to the RAID controller, the RAID controller being further configured to store a set of pointers within the memory, the pointers respectively corresponding to blocks of data within the array, each pointer being accessible by the user application, the RAID controller being further configured to anticipate a data modification operation to a particular block of data in the array responsive to the measuring and to selectively copy the particular block of data to a different block of data within a different RAID level storage location within the array responsive to the anticipating.

2. A system in accordance with claim 1 wherein the RAID controller is further configured to selectively create a different pointer corresponding to the different block of data.

3. A system in accordance with claim 1 wherein the RAID controller is further configured to perform the measuring and the anticipating and the copying from time to time.

4. A system in accordance with claim 1 wherein the RAID controller is further configured to selectively invoke a protective status for the particular block of data within the array.

5. A system in accordance with claim 4 wherein the RAID controller is further configured to selectively perform the copying of the particular block of data to the different block of data responsive to the anticipating and the protective status.

6. A method of managing a data storage system, comprising:
   providing an array of data disks configured to store data;
   providing a RAID controller coupled to the array;
   providing a user interface computer coupled to the RAID controller;
   running an application program using the user interface computer;
   reading data stored within the array using the application program and the RAID controller;
   assembling and storing a pointer corresponding to the read data using the RAID controller;
   accessing the data within the array by way of the pointer using the application program and RAID controller;
   measuring the rate of the accessing using the RAID controller;
   anticipating a data modification operation to particular data in one RAID level within the array in response to the measuring using the RAID controller;
   selectively copying the particular data to another RAID level within the array in response to the anticipating using the RAID controller; and
   performing the data modification operation to the copied data within the array using the RAID controller, the copying being performed as a background operation using the RAID controller.

7. A method in accordance with claim 6 and further comprising selectively creating another pointer corresponding to the copied data using the RAID controller.

8. A method in accordance with claim 6 and further comprising selectively invoking a protective status for the particular data and selectively performing the copying and the data modification responsive to the anticipating and the protective status.

9. A RAID controller, comprising:
   a memory configured to store data;
   monitoring electronics configured to measure a rate at which an array of data storage disks coupled to the controller are accessed using the Raid controller; and
   circuitry coupled to the memory and the monitoring electronics and configured to access data at different RAID levels within the array in response to corresponding instructions from a computer, the circuitry being further configured to selectively configure a pointer related to the data in the array in response to a corresponding instruction from the computer, the circuitry being further configured to anticipate a data modification operation in response to the measuring, the circuitry being further configured to selectively copy a portion of the data in one RAID level within the array to a different RAID level within the array as a background operation in response to the anticipating using the memory.

10. A RAID controller in accordance with claim 9 wherein the circuitry is further configured to selectively create a new pointer corresponding to the copied data.

11. A RAID controller in accordance with claim 9 wherein the monitoring electronics are further configured to determine an amount of free space in the array, and wherein the circuitry is further configured to perform the copying in response to the anticipating and the determining.

12. A RAID controller in accordance with claim 9 wherein the circuitry is further configured to selectively invoke a protective status for the portion of the data in the one RAID level of the array and to perform the selective copying in response to the anticipating and the protective status.

13. A RAID controller in accordance with claim 9 wherein the circuitry is further configured to modify the copied data in response to a corresponding instruction from the computer.

14. A computer readable medium comprising computer readable code, the computer readable code configured to cause a RAID controller to:
   read data within an array of data storage disks coupled to the RAID controller in response to corresponding instructions from a computer;
   selectively configure a pointer related to the read data;
   access data within the array using the pointer in response to corresponding instructions from the computer;
   anticipate a data modification operation in response to measuring a rate at which the data within the array is accessed; and
   selectively copy a portion of the data in one RAID level within the array to a different RAID level within the array as a background operation in response to the anticipating.

15. A computer readable medium in accordance with claim 14 wherein the computer readable medium comprises firmware.

16. A RAID controller, comprising:
   a memory configured to store data;
   monitoring electronics configured to measure a rate at which an array of data storage disks coupled to the RAID controller are accessed using the RAID controller; and
   firmware bearing computer readable code, the computer readable code being configured to cause the RAID controller to:
      read data within the array in response to corresponding instructions from a computer;
      selectively configure a pointer related to the read data;
      access data within the array using the pointer in response to a corresponding instruction from the computer;
      anticipate a data modification operation in response to measuring the rate using the monitoring electronics; and
      selectively copy a portion of the data in one RAID level within the array to a different RAID level within the array as a background operation in response to the anticipating using the memory.

17. A computer readable medium comprising computer readable code, the computer readable code configured to cause a computer to:
   read data within different RAID levels within an array of data storage disks coupled to the computer in response to corresponding instructions sent from the computer to a RAID controller;
   selectively configure a plurality of pointers related to the read data, the pointers being stored within a memory of the computer;
   access data at different RAID levels within the array using the pointers in response to corresponding instructions sent from the computer to the RAID controller;
   measure a rate at which the computer is accessing the data within the array;
   anticipate a data modification operation in response to the measuring; and
   selectively instruct the RAID controller to copy a portion of the data in one RAID level within the array to a different RAID level within the array as a background operation in response to the anticipating.

18. A computer readable medium in accordance with claim 17 wherein the computer readable medium is selected from the group consisting of magnetic disk, magnetic tape, compact disk, ROM, EPROM, optical disk, and magneto-optical disk.

19. A method of managing a data storage system, comprising:
   providing an array of data disks configured to store data;
   providing a RAID controller coupled to the array;
   providing a computer coupled to the RAID controller;
   providing a computer readable medium having computer readable code in cooperative relation to the computer;
   running the computer readable code using the computer;
   reading data stored within the array using the computer readable code and the computer and the RAID controller;
   assembling and storing a pointer corresponding to the read data within a memory of the computer using the computer readable code and the computer;
   accessing the data within the array by way of the pointer using the computer readable code and the computer and the RAID controller;
   measuring the rate of the accessing the data using the computer readable code and the computer;
   anticipating a data modification operation to particular data in one RAID level within the array in response to the measuring using the computer readable code and the computer;
   selectively copying the particular data to another RAID level within the array in response to the anticipating using the computer readable code and the computer and the RAID controller; and
   performing the data modification operation to the copied data within the array using the computer readable code and the computer and the RAID controller, the copying and the data modification being performed as a background operation.

* * * * *